US 7,599,382 B2

(12) United States Patent
Mao

(10) Patent No.: US 7,599,382 B2
(45) Date of Patent: Oct. 6, 2009

(54) SERIAL TRANSCEIVER AND METHOD OF TRANSMITTING PACKAGE

(75) Inventor: Jin Liang Mao, Hsin-Tien (TW)

(73) Assignee: VIA Technologies, Inc., Taipei (TW)

( * ) Notice: Subject to any disclaimer, the term of this patent is extended or adjusted under 35 U.S.C. 154(b) by 653 days.

(21) Appl. No.: 11/376,131

(22) Filed: Mar. 16, 2006

(65) Prior Publication Data

US 2007/0071038 A1    Mar. 29, 2007

(30) Foreign Application Priority Data

Sep. 23, 2005    (TW) .............................. 94133252 A

(51) Int. Cl.
*H04L 12/28*    (2006.01)
*H04L 12/66*    (2006.01)
*H04J 3/06*    (2006.01)
*G06F 13/00*    (2006.01)

(52) U.S. Cl. ..................... 370/419; 370/463; 370/517; 710/71

(58) Field of Classification Search ................. None
See application file for complete search history.

(56) References Cited

U.S. PATENT DOCUMENTS

| | | | | |
|---|---|---|---|---|
| 5,541,596 A | * | 7/1996 | Yoshida | ...................... 341/100 |
| 5,740,212 A | * | 4/1998 | Oh et al. | ...................... 375/372 |
| 6,493,301 B1 | * | 12/2002 | Park | ........................ 369/53.15 |
| 6,744,272 B2 | * | 6/2004 | Ernst et al. | ................... 324/765 |
| 6,791,777 B2 | * | 9/2004 | Watanabe et al. | ............. 360/51 |
| 7,054,401 B2 | * | 5/2006 | Kada et al. | .................. 375/355 |

* cited by examiner

*Primary Examiner*—Chi H Pham
*Assistant Examiner*—Soon-Dong D Hyun
(74) *Attorney, Agent, or Firm*—Birch, Stewart, Kolasch & Birch, LLP

(57) ABSTRACT

A serial transceiver transmits at least one package of a data link layer and includes at least one channel including at least one transmitting module and at least one receiving module, a generating module and a controlling module. The channel is for transmitting the corresponding package. The transmitting module transmits the corresponding package and generates a transmitting time signal. The receiving module receives the package transmitted from the corresponding transmitting module and generates a receiving time signal. The generating module generates a target delay time signal. The controlling module receives the target delay time signal, transmitting time signals and receiving time signals, and generates a delay time signal for the corresponding receiving module according to the target delay time signal, the transmitting time signal and the receiving time signal. The receiving module receives the corresponding delay time signal and delays the transmission of the package according to the delay time signal such that the data link layer receives each package at the same time.

18 Claims, 4 Drawing Sheets

| | Delay time | Delay time of SIPO converter | Delay time of deskewer | Total delay time |
|---|---|---|---|---|
| 1st channel | 40ns | 1×4=4ns | 0 | 40+4+0=44ns |
| 2nd channel | 32ns | 3×4=12ns | 0 | 32+12+0=44ns |
| 3rd channel | 16ns | 3×4=12ns | 4×4=16ns | 16+12+16=44ns |
| 4th channel | 8ns | 3×4=12ns | 6×4=24ns | 8+12+24=44ns |

SERIAL TRANSCEIVER AND METHOD OF TRANSMITTING PACKAGE

BACKGROUND OF THE INVENTION

1. Field of Invention

The invention relates to a transceiver and a method of transmitting at least one package. In particular, the invention relates to a serial transceiver and a method of transmitting at least one package in a serial transceiver.

2. Related Art

To overcome the speed limit in parallel transmissions, high-speed serial transmission has been widely used in communication and computer systems nowadays.

As shown in FIG. 1, a serial transceiver 1 includes a plurality of transmitting modules 11 and a plurality of receiving modules 12. Each receiving module 12 includes a serial-in-parallel-out converter 121 and a deskewer 122. During the loop back test of the serial transceiver 1, the transmitting module 11 sends the package from a data link layer 21 to an external circuit 22. The serial-in-parallel-out converter 121 receives the package from an external circuit 22 and converts the package from a serial signal to a parallel signal. The deskewer 122 deskews a package, so that the package transmitted by each transmitting module is delayed by the corresponding deskewer. The packages from the channels can be simultaneously sent to the data link layer 21. The layers above the data link layer also check the package to check whether the serial transceiver 1 functions normally.

Even though the packages of the channels can simultaneously reach the data link layer, packages sent at different times are not guaranteed to reach the data link layer within a fixed time. Therefore, the serial transceiver has to check the layers above the data link layer with using a specific machine, instead of the usual simpler method. This kind of checking is likely to have misjudgment on the serial transceiver because of the delay time of the packages is not fixed.

Therefore, it is highly desirable to provide a serial transceiver to reduce the effect of the external circuit during the look back test and to fix the delay time during the package transmissions, thereby ensuring correct tests of the serial transceiver, avoiding misjudgment, increasing the yield, and reducing the production cost.

SUMMARY OF THE INVENTION

The invention provides a serial transceiver, which can fix a delay time during the loop back test, and the method of transmitting at least one package therein.

In the present invention, a serial transceiver transmits at least one package in a data link layer and includes at least one channel including at least one transmitting module, at least one receiving module, a generating module, and a controlling module. The channel is for transmitting the corresponding package. The transmitting module transmits one package and generates a corresponding transmitting time signal. The receiving module receives the package transmitted from the corresponding transmitting module and generates a receiving time signal. The generating module generates a target delay time signal. The controlling module receives the target delay time signal, the transmitting time signals and the receiving time signals, and generates a delay time signal for the receiving module according to the target delay time signal, the transmitting time signal and the receiving time signal. The receiving module receives the corresponding delay time signal and delays the transmission of the package according to the delay time signal such that the data link layer receives each package at the same time.

The invention also provides a method of transmitting at least one package in a data link layer via at least one channel in a serial transceiver. The method includes: transmitting the packages via the corresponding channels and generating a transmitting time signal; then receiving the packages via the corresponding channels and generating a receiving time signal; then generating at least one delay time signals according to a target delay time signal, the transmitting time signals, and the receiving time signals; and delaying transmissions of the packages in the channels to the data link layer according to the delay time signal. Thus, the data link layer simultaneously receives the packages.

The serial transceiver and the control method thereof of the invention delay the transmission of each package to the data link layer in each channel or each receiving module, so that the data link layer simultaneously receives the packages. Therefore, the influence of the external circuit can be reduced during the loop back test. The delay time for transmitting the packages can be fixed, so that the serial transceiver can be more accurately detected. As a result, the invention can avoid misjudgment during tests, increase the yield, and reduce the production cost.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
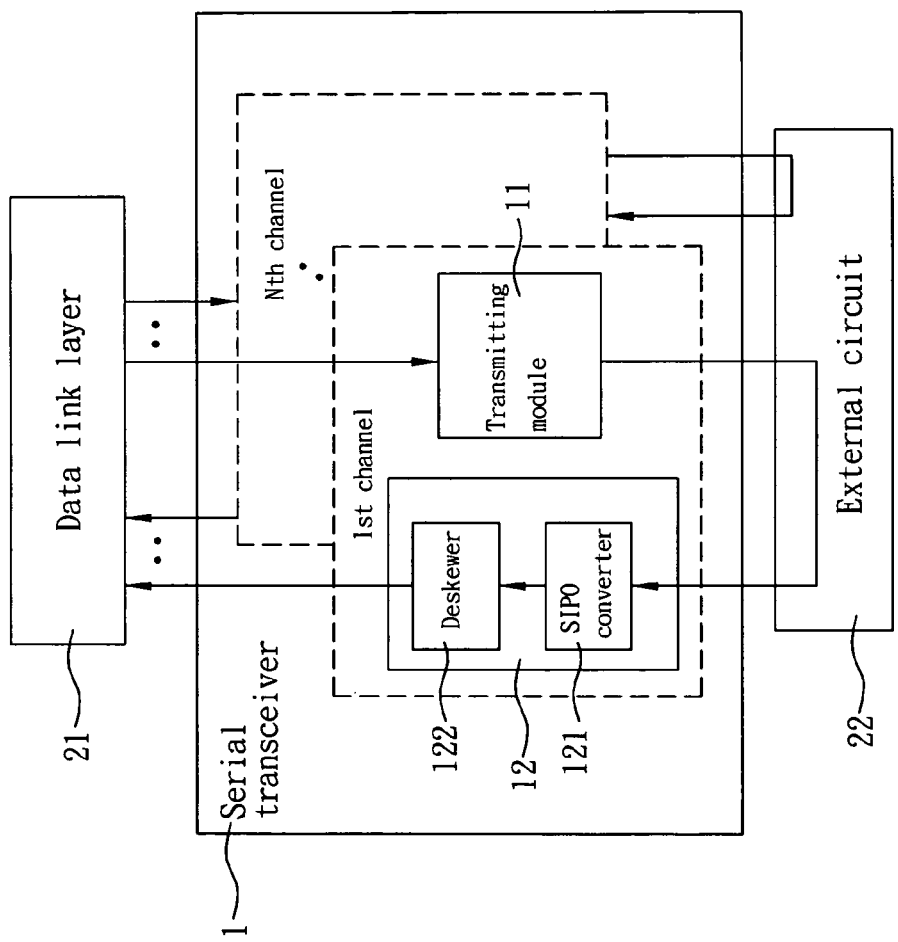
FIG. 1 is a block diagram of the conventional serial transceiver.
Figure 2:
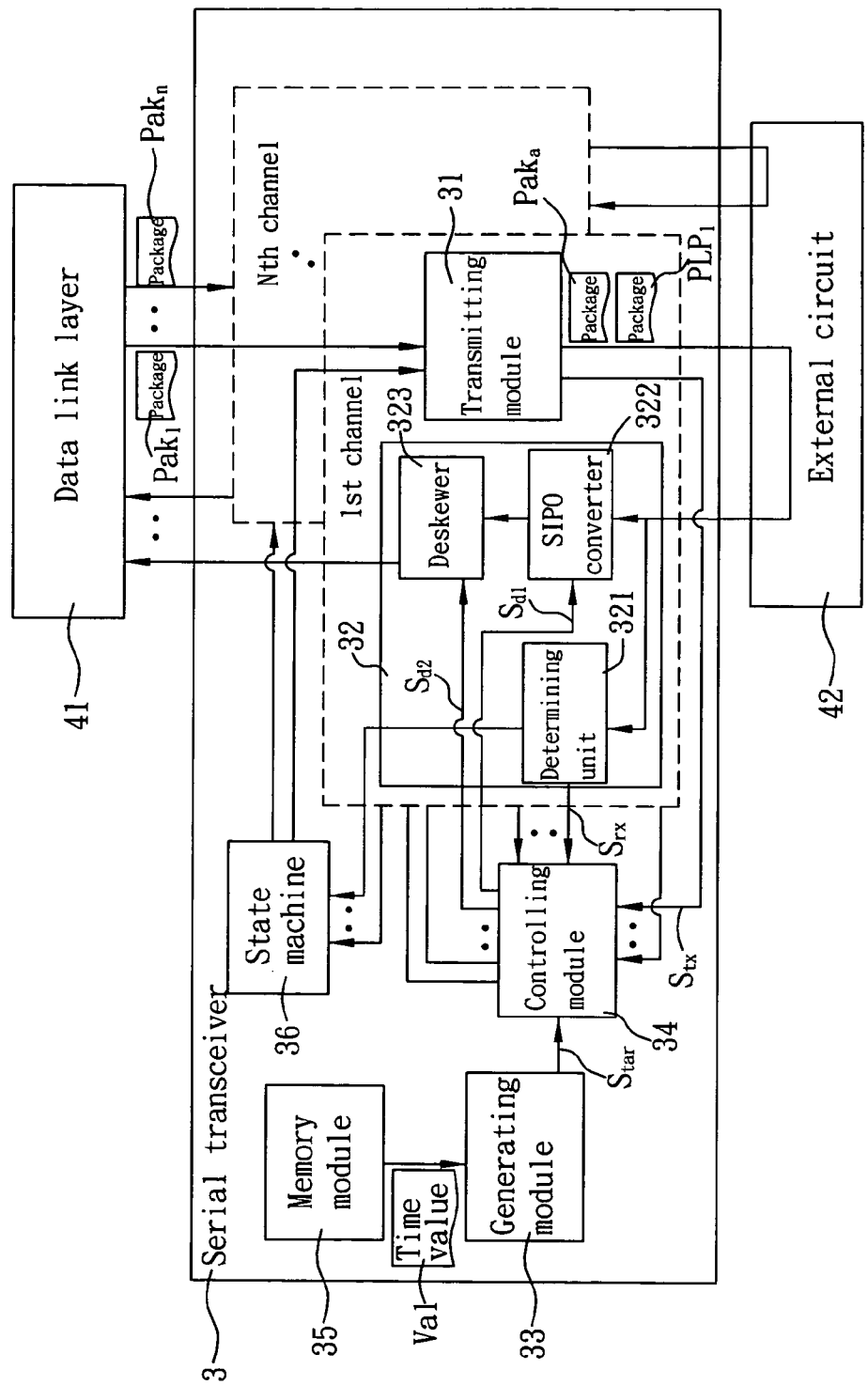
FIG. 2 is a block diagram of a serial transceiver according to a preferred embodiment of the invention.

As shown in FIG. 2, a serial transceiver 3 according to a preferred embodiment of the invention transmits several packages $Pak_1$ to $Pak_n$ in a data link layer 41. The serial transceiver 3 includes at least one channel for transmitting at least one package from the data link layer 41, a generating module 33, and a controlling module 34. Each channel includes at least one transmitting modules 31 and at least one receiving modules 32.

Take a first channel as an example. The transmitting module 31 transmits a package $Pak_1$ and generates a transmitting time signal $S_{tx}$. The receiving module 32 receives the corresponding package $Pak_1$ transmitted from the transmitting module 31 and generates a receiving time signal $S_{rx}$. It is noted that the clock compensation function in the receiving module 32 is disabled to avoid the receiving delay misjudge. The generating module 33 generates a target delay time signal $S_{tar}$. The controlling module 34 receives the target delay time signal $S_{tar}$, the transmitting time signals $S_{tx}$ and the receiving time signals $S_{rx}$ to generate a delay time signal for the receiving module 32. Accordingly, the transmission of the package $Pak_1$ to the data link layer 41 is delayed by the receiving module 32.

In this embodiment, the transmitting module 31 transmits the package $Pak_1$ to the receiving module 32 via an external circuit 42. The controlling module 34 counts the latency of the package $Pak_1$ transmitted from the transmitting module via the external circuit 42 to the receiving module 32 according to the transmitting time signal $S_{tx}$ and the receiving time signal $S_{rx}$. The target delay time signal $S_{tar}$ is set as the delay time of the package $Pak_1$ transmitted from the transmitting module 31 via the receiving module 32 to the data link layer 41. Therefore, the controlling module 34 computes the difference between the delay time of the package $Pak_1$ and the target delay time signal $S_{tar}$ to generate a delay time signal $S_{d1}$ and $S_{d2}$.

The receiving module 32 delays the transmission of the package $Pak_1$ according to the delay time signals $S_{d1}$ and $S_{d2}$. Similarly, the receiving module of other channels also delays the corresponding packages transmission according to the receiving corresponding delay time signals. Thus, the data link layer 41 simultaneously receives the packages $Pak_1$ to $Pak_n$ from all channels.

Moreover, the serial transceiver 3 further includes a memory module 35, which records a predetermined delay time value Val. The generating module 33 generates the target delay time signal $S_{tar}$ according to the predetermined delay time value Val.

In the first channel of this embodiment, the receiving module 32 includes a determining unit 321, a serial-in-parallel-out converter 322, and a deskewer 323. The serial-in-parallel-out converter 322 and the deskewer 323 have a buffer for temporarily storing the packages.

The transmitting module 31 can add a physical layer package $PLP_1$ to the corresponding package $Pak_1$. Besides, the transmitting module 31 also generates the transmitting time signal $S_{tx}$ according to the physical layer package $PLP_1$. The determining unit 321 determines the physical layer package $PLP_1$ added to the package $Pak_1$ to generate the receiving time signal $S_{rx}$.

Figures 3, 4:
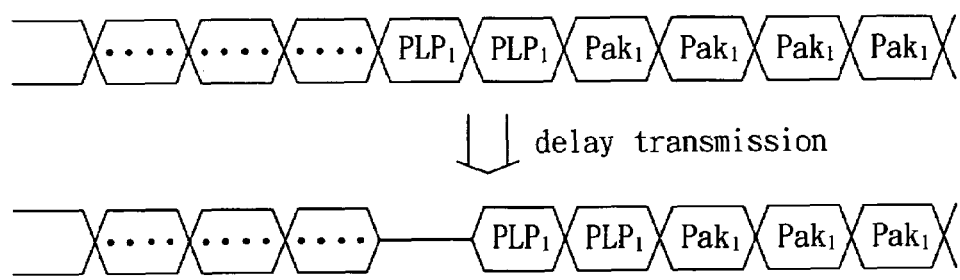
FIG. 3 is a schematic view showing a delay time in the serial transceiver according to the embodiment of the invention.
FIG. 4 is a schematic view showing delaying the package transmission in the serial transceiver according to the embodiment of the invention.

FIG. 3 shows an example of delay time in the embodiment. Assume one clock period of the serial transceiver 3 is 4 ns. Regarding to the transmitting time signal $S_{tx}$ and the receiving time signal $S_{rx}$, the delay time of the package $Pak_1$ is known to be 40 ns. Assume the predetermined delay time value Val recorded in the memory module 35 is 44 ns. The generating module 33 sets the target delay time signal $S_{tar}$ to be 44 ns according to the predetermined delay time value Val. Therefore, the controlling module 34 generates the delay time signals $S_{d1}$ and $S_{d2}$ for the first channel according to the target delay time signal $S_{tar}$, the transmitting time signal $S_{tx}$ and the receiving time signal $S_{rx}$.

The serial-in-parallel-out converter 322 converts the package $Pak_1$ and the physical layer package $PLP_1$ from a serial signal to a parallel signal. The converted package $Pak_1$ and physical layer package $PLP_1$ are temporarily stored in the buffer of the serial-in-parallel-out converter 322. Since the determining unit 321 has checked the physical layer package $PLP_1$ and generated the delay time signal $S_{d1}$, the serial-in-parallel-out converter 322 delays one clock according to the delay time signal $S_{d1}$ before sending the package $Pak_1$ to the deskewer 323.

The deskewer 323 temporarily stores the package $Pak_1$ in the buffer thereof, and does not delay the transmission of the package $Pak_1$ to the data link layer 41 according to the delay time signal $S_{d2}$. The serial-in-parallel-out converter 322 and the deskewer 323 can control the buffer tag for delaying the transmission of data in the buffer.

Besides, if the delay time of the package in the third channel is 16 ns. Therefore, the controlling module respectively controls the serial-in-parallel-out converter to delay 12 ns and controls the deskewer to delay 16 ns before sending the packages. As shown in FIG. 3, after a proper controlling the delay time of the serial-in-parallel-out converter and the deskewer in each channel, the total delay time of each channel will be the same (44 ns in the embodiment) and therefore the packages can be simultaneously transmitted to the data link layer 41.

Moreover, the controlling module 34 can reset the target delay time signal $S_{tar}$ according to the delay time of each channel. If the predetermined delay time value Val recorded in the memory module 35 is 48 ns. After a period of observation, the delay time of the first channel is the longest among all. Therefore, the controlling module 34 sets the target delay time signal $S_{tar}$ to be 40 ns or 44 ns according to the delay time of the first channel. This can appropriately shorten the total delay time in each channel to improve the efficiency of loop back tests.

With reference to FIG. 2 again, the serial transceiver 3 further includes a state machine 36. The state machine 36 controls the transmitting module in each channel to transmit the package and controls the transmitting modules to transmit an adjusting package $Pak_a$ for delaying the package transmission. Take the first channel as an example. If the package $Pak_1$ reaches the determining unit 321 earlier than other packages $Pak_2$ to $Pak_{10}$, the state machine 36 controls the transmitting module 31 to transmits an adjusting package $Pak_a$ to delay the transmission of the next package $Pak_1$. The packages $Pak_1$ to $Pak_{10}$ in the next transmission can thus simultaneously reach each of the determining units 321. The adjusting package $Pak_a$ can be an orderset or a package above the data link layer.

Figure 5:
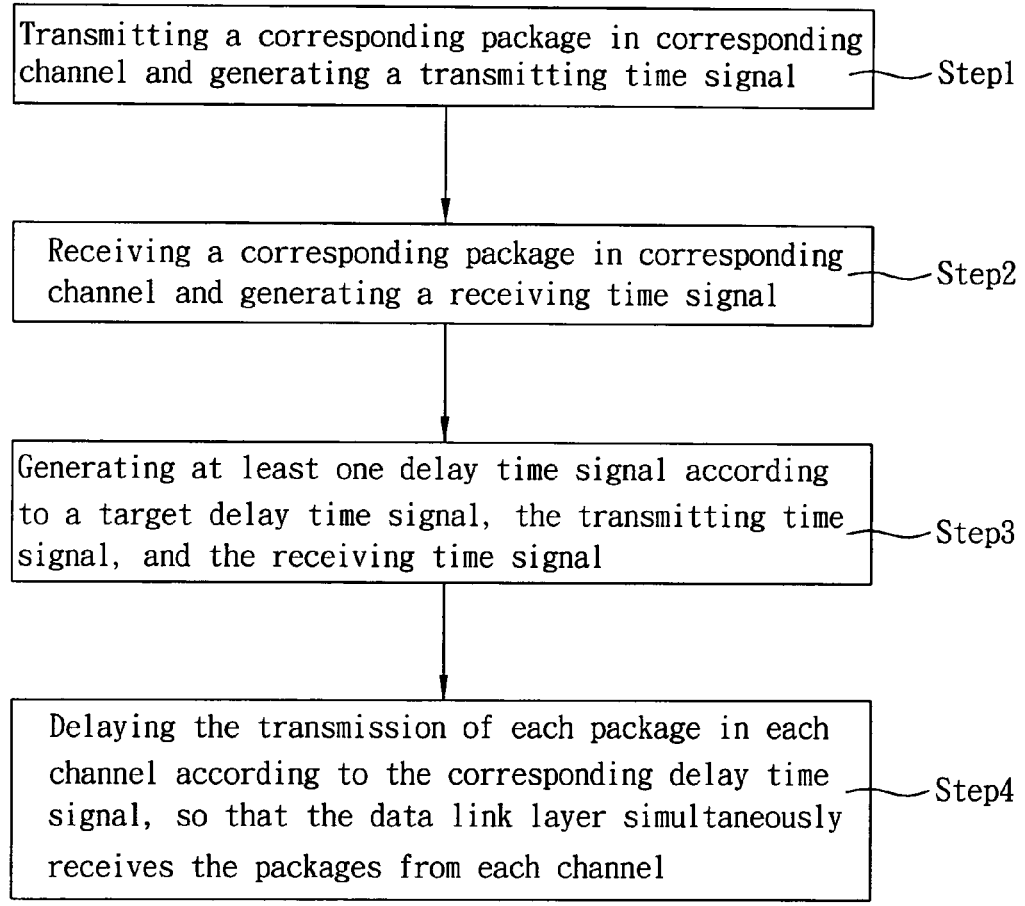
FIG. 5 is the flowchart showing a control method of the serial transceiver according to a preferred embodiment of the invention.

As illustrated in FIG. 5, a control method of a serial transceiver according to a preferred embodiment of the invention controls the serial transceiver to transmit several packages in a data link layer via several channels. The control method includes the following steps (Step1 to Step4).

In step Step1, transmitting a corresponding package in corresponding channel and generating a transmitting time signal.

In step Step2, receiving a corresponding package in corresponding channel and generating a receiving time signal.

In step Step3, generating at least one delay time signal according to a target delay time signal, the transmitting time signal, and the receiving time signal.

In step Step4, delaying the transmission of each package in each channel according to the corresponding delay time signal, so that the data link layer simultaneously receives the packages from each channel.

Since the control method of the serial transceiver in this embodiment can be applied to the serial transceiver of the previous embodiment shown in FIGS. 2 and 4, and the possible implementation and effects of this method are discussed, so the detailed descriptions of the control method of the invention are omitted herein.

In conclusion, the serial transceiver and the control method thereof of the invention delay the transmission of each package to the data link layer in each channel or each receiving module, so that the data link layer simultaneously receives the packages. Therefore, the influence of the external circuit can be reduced during the loop back test. The delay time for transmitting the packages can be fixed, so that the serial transceiver can be more accurately detected. As a result, the invention can avoid misjudgment during tests, increase the yield, and reduce the production cost.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A serial transceiver for transmitting at least one package in a data link layer, the serial transceiver comprising:
   at least one channel for transmitting a corresponding package, wherein the channel comprises at least one transmitting module for transmitting the corresponding package and generating a transmitting time signal, and at least one receiving module for receiving the corresponding package from the transmitting module and generating a receiving time signal;
   a generating module for generating a target delay time signal; and
   a controlling module for generating a delay time signal for the receiving module according to the target delay time signal, the transmitting time signal and the receiving time signal;
   wherein a total delay time of each channel is the same and the data link layer simultaneously receives all corresponding packages.

2. The serial transceiver of claim 1, wherein the transmitting module adds a physical layer package to the corresponding package and generates the transmitting time signal according to the physical layer package.

3. The serial transceiver of claim 2 wherein the receiving module comprises a determining unit for checking the physical layer package added to the package to generate the receiving time signal.

4. The serial transceiver of claim 1 wherein the receiving module comprises a serial-in-parallel-out converter for transferring the package from a serial signal to a parallel signal, and a deskewer for deskewing the package.

5. The serial transceiver of claim 4 wherein the serial-in-parallel-out converter and the deskewer respectively has a buffer for temporarily storing the package and the delay time signal to delay transmission of the package in the buffer.

6. The serial transceiver of claim 4 wherein a clock compensation function of the serial-in-parallel-out converter is disabled.

7. The serial transceiver of claim 1 wherein the receiving modules comprises a determining unit for checking the package to generate the receiving time signal.

8. The serial transceiver of claim 1 further comprising: a state machine for controlling the transmitting module to transmit an adjusting package for delaying the package transmission from the transmission module to the receiving module.

9. The serial transceiver of claim 8, wherein the adjusting package is an orderset or a package above the data link layer.

10. The serial transceiver of claim 1 further comprising:
    a memory module for recording a predetermined delay time value, wherein the generating module generates the target delay time signal according to a predetermined delay time value.

11. A method of transmitting at least one package in a data link layer via at least one channel in a serial transceiver, the method comprising:
    transmitting the package via a corresponding channel and generating a transmitting time signal;
    receiving the package via the corresponding channel and generating a receiving time signal;
    generating at least one delay time signal according to a target delay time signal, the transmitting time signal, and the receiving time signal; and
    delaying transmission of the package in the channel to the data link layer according to the delay time signal, wherein the data link layer simultaneously receives all corresponding packages.

12. The method of claim 11 further comprising:
    adding a physical layer package to the corresponding package; and
    generating the transmitting time signal according to the physical layer package.

13. The method of claim 12 further comprising:
    receiving the corresponding package with the physical layer package; and
    generating the receiving time signal according to the corresponding package with the physical layer package.

14. The method of claim 11 further comprising:
    temporarily storing the packages in a buffer, and
    delaying the transmission of the package temporarily stored in the buffer to the data link layer according to the delay time signal.

15. The method of claim 14 wherein the buffer is in a serial-in-parallel-out converter.

16. The method of claim 14 wherein a clock compensation function of a serial-in-parallel-out converter is disabled.

17. The method of claim 14 wherein the buffer is in a deskewer.

18. The method of claim 11 further comprising: transmitting at least one adjusting package to delay the package transmission from the transmission module to the receiving module in the transmitting step.

* * * * *